(12) United States Patent
Sato

(10) Patent No.: US 11,391,397 B2
(45) Date of Patent: *Jul. 19, 2022

(54) PIPE STRUCTURE AND CONSTRUCTION METHOD

(71) Applicant: SUIKEN Co., Ltd., Shiga (JP)

(72) Inventor: Toshiyuki Sato, Shiga (JP)

(73) Assignee: SUIKEN Co., Ltd., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/252,231

(22) PCT Filed: Jul. 1, 2019

(86) PCT No.: PCT/JP2019/026117
§ 371 (c)(1),
(2) Date: Dec. 14, 2020

(87) PCT Pub. No.: WO2020/013008
PCT Pub. Date: Jan. 16, 2020

(65) Prior Publication Data
US 2021/0254761 A1    Aug. 19, 2021

(30) Foreign Application Priority Data
Jul. 11, 2018    (JP) .............................. JP2018-131328

(51) Int. Cl.
*F16L 9/12* (2006.01)
*B23C 3/34* (2006.01)
(Continued)

(52) U.S. Cl.
CPC ................. *F16L 9/12* (2013.01); *B23C 3/34* (2013.01); *B26D 3/16* (2013.01); *B29C 65/04* (2013.01);
(Continued)

(58) Field of Classification Search
CPC . F16L 9/12; F16L 41/06; F16L 55/105; F16L 55/00; B23C 3/34; B26D 3/16;
(Continued)

(56) References Cited

U.S. PATENT DOCUMENTS 3,634,167 A * 1/1972 Plontke ............... B29C 66/1122
156/257
5,611,365 A * 3/1997 Maichel ................ F16L 55/105
137/15.17
(Continued)

FOREIGN PATENT DOCUMENTS

DE    2159518 A1 * 6/1973    ........... F16K 27/044
JP    S54-81923    6/1979
(Continued)

OTHER PUBLICATIONS

International Search Report Issued in PCT/JP2019/026117 dated Aug. 27, 2019.

*Primary Examiner* — Michael N Orlando
*Assistant Examiner* — Christopher W Raimund
(74) *Attorney, Agent, or Firm* — Renner, Otto, Boisselle & Sklar, LLP

(57) ABSTRACT

A structure including: a straight pipe made of a polyolefin-based material; a pair of ridges made of a polyolefin-based material, extending in a circumferential direction along an outer surface of the straight pipe, and spaced apart from each other in an axial direction of the straight pipe; a piping material including a plurality of metal-made separate cases, which are separated from each other in the circumferential direction of the straight pipe and enclose a portion of the straight pipe; and a pair of engagement portions formed on at least one of the separate cases and engaging respectively with the pair of ridges.

2 Claims, 18 Drawing Sheets

(51) Int. Cl.
*B26D 3/16* (2006.01)
*B29C 65/04* (2006.01)
*B29C 65/00* (2006.01)
*F16L 41/06* (2006.01)
*B29L 23/00* (2006.01)

(52) U.S. Cl.
CPC ............ *B29C 66/532* (2013.01); *F16L 41/06* (2013.01); *B29C 2793/0054* (2013.01); *B29L 2023/22* (2013.01)

(58) Field of Classification Search
CPC ................. B29C 65/04; B29C 66/532; B29C 2793/0054; B29L 2023/22
See application file for complete search history.

(56) References Cited

U.S. PATENT DOCUMENTS

| | | | |
|---|---|---|---|
| 2006/0225545 | A1* | 10/2006 | Nolan ....................... B23C 1/20 83/13 |
| 2012/0222753 | A1* | 9/2012 | Sato ........................ F16L 41/16 137/15.14 |
| 2013/0026407 | A1 | 1/2013 | Choo et al. |

FOREIGN PATENT DOCUMENTS

| | | |
|---|---|---|
| JP | S60-45974 U | 4/1985 |
| JP | H09-196257 A | 7/1997 |
| JP | 2000-179779 A | 6/2000 |
| JP | 2002-39485 A | 2/2002 |
| JP | 2002-98287 A | 4/2002 |
| JP | 2004-69059 A | 3/2004 |
| JP | 2004-245397 A | 9/2004 |
| JP | 2007-252837 A | 10/2007 |
| JP | 2014-118998 A | 6/2014 |

\* cited by examiner

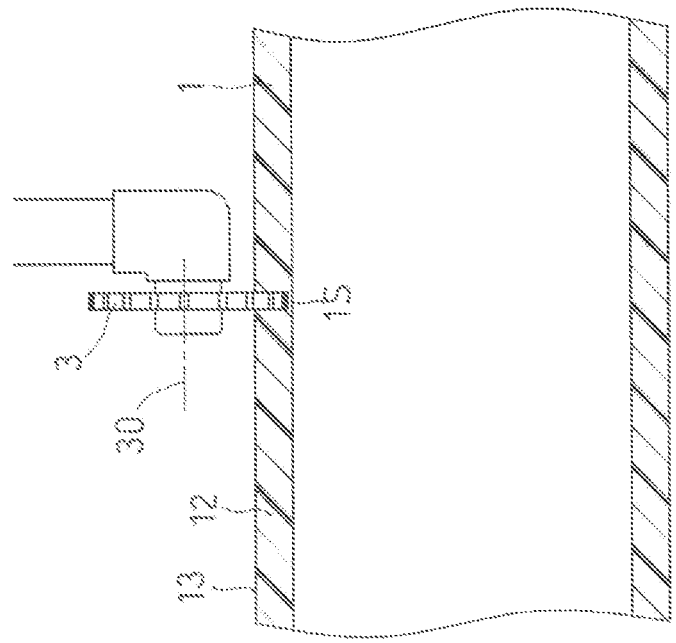
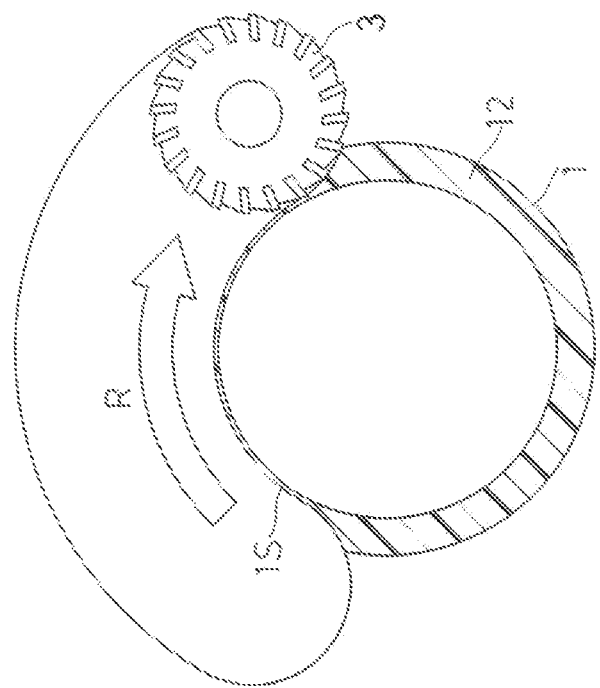
FIG. 1B
FIG. 1A

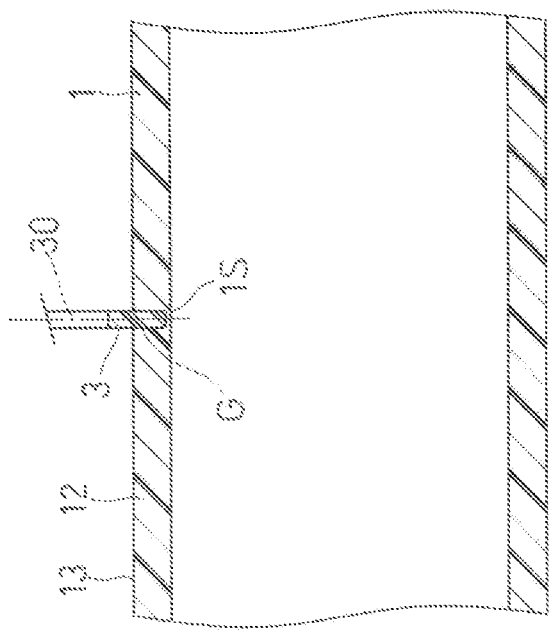
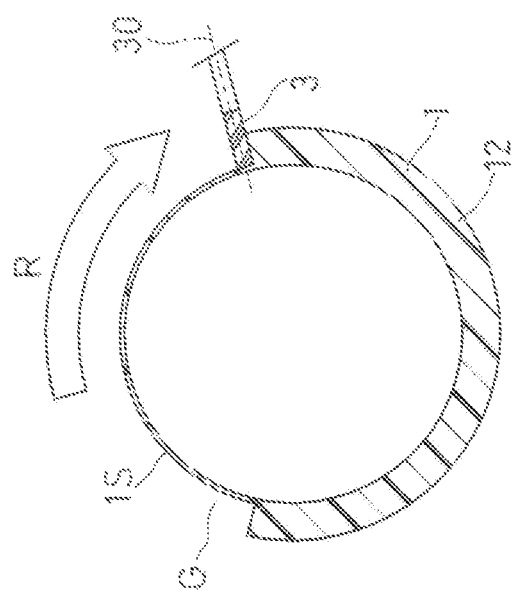
FIG. 2A
FIG. 2B

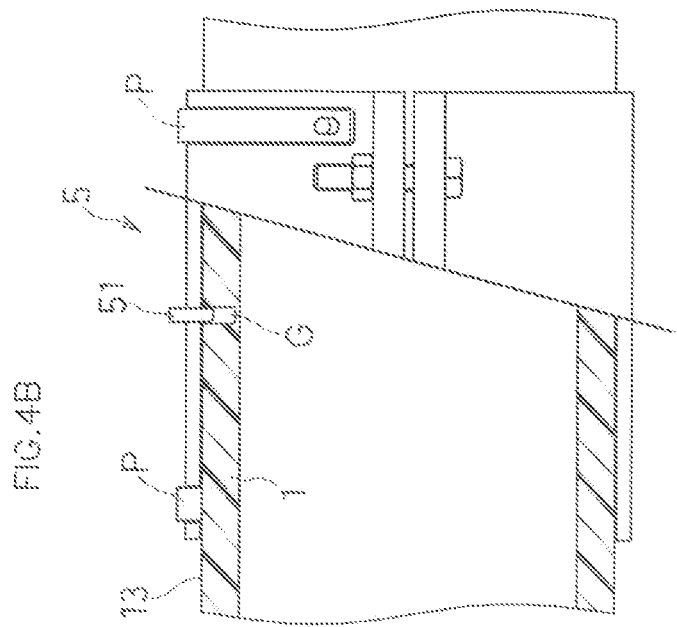
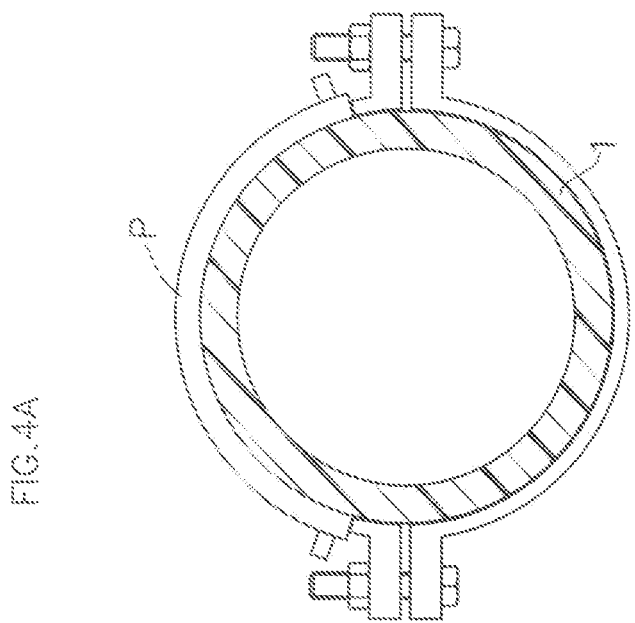

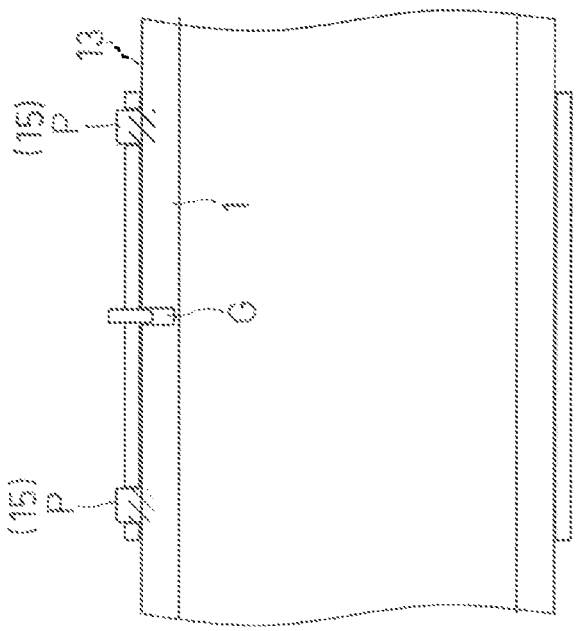
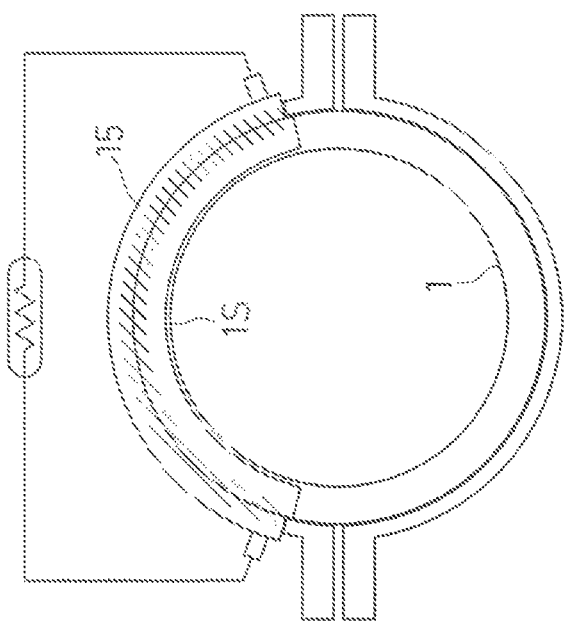

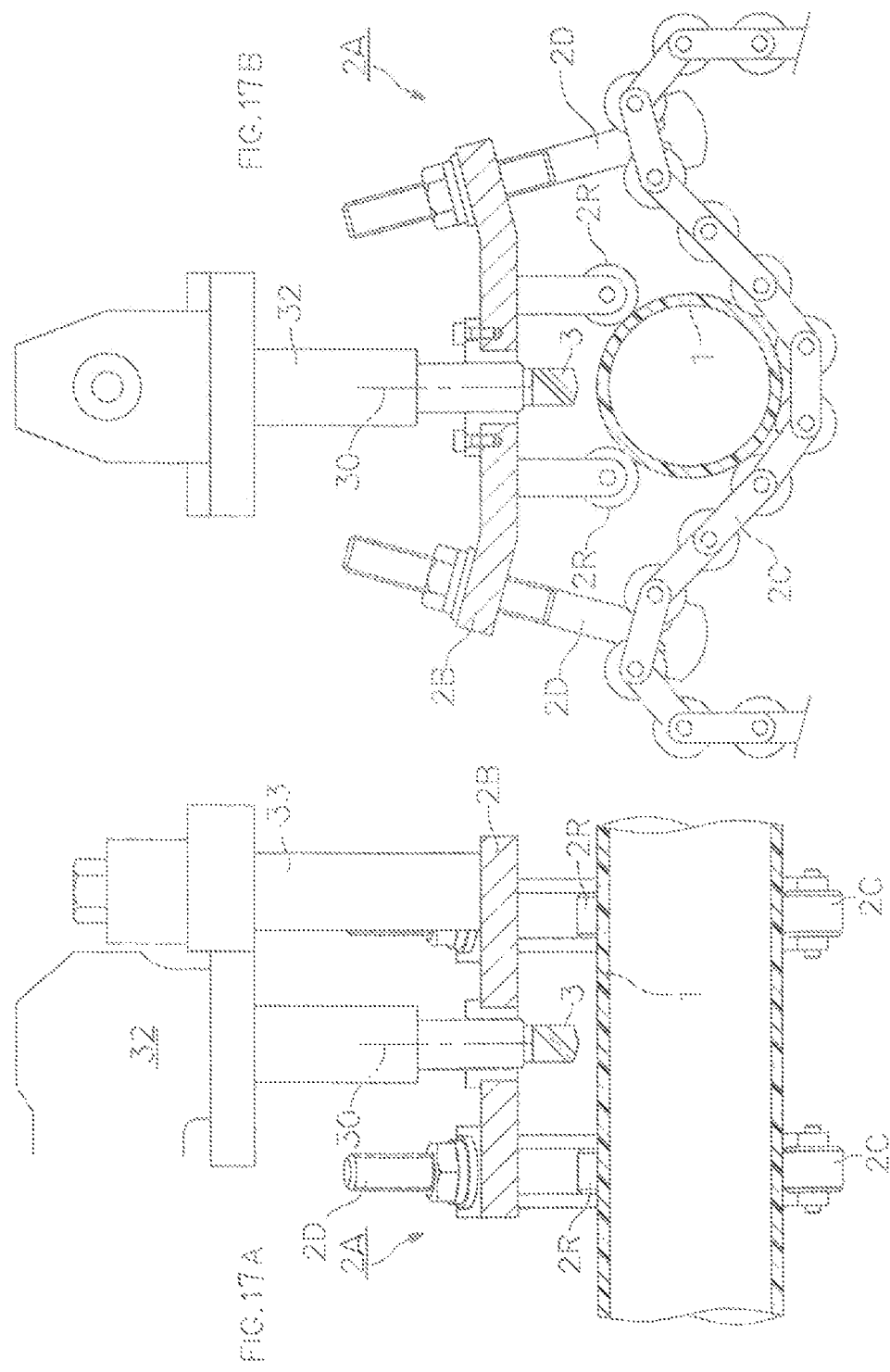

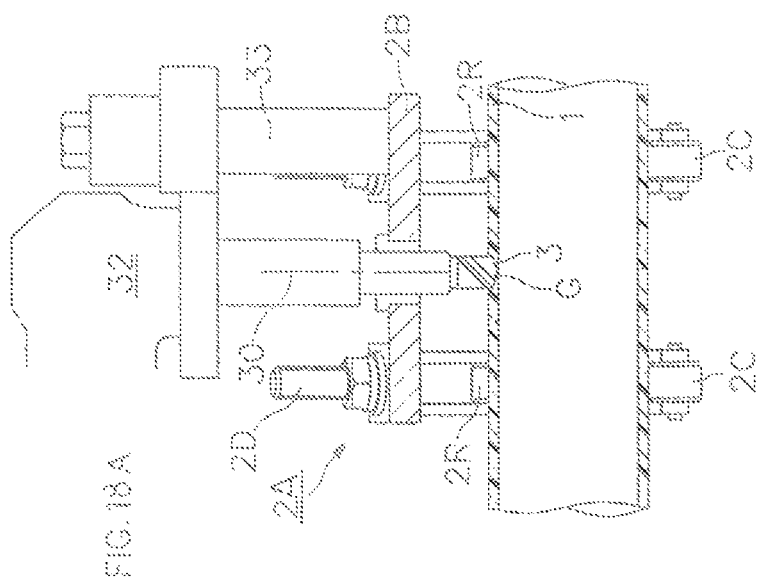
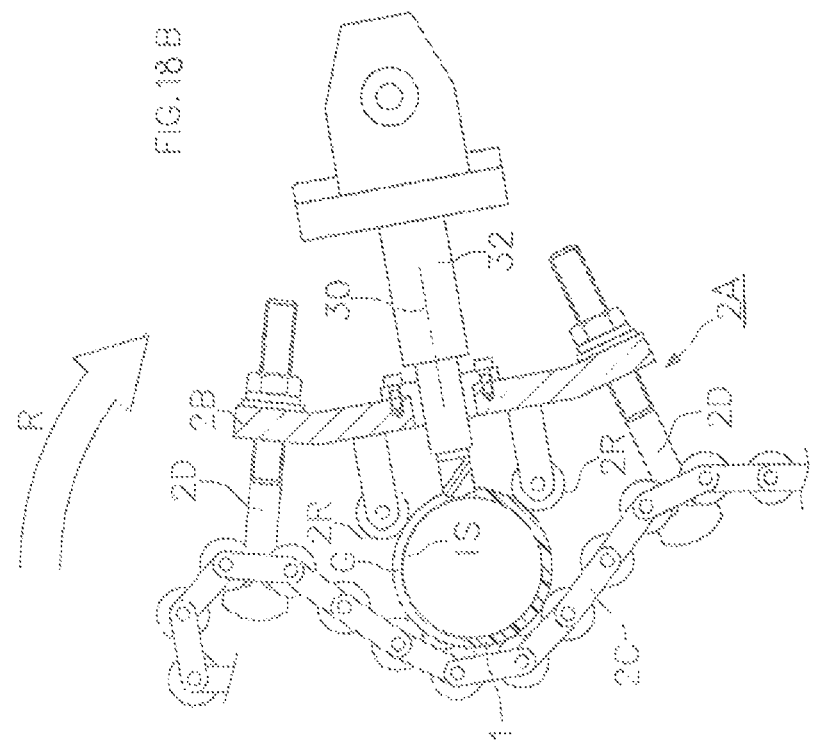

PIPE STRUCTURE AND CONSTRUCTION METHOD

TECHNICAL FIELD

The present invention relates to a pipe structure in which a gate valve, etc., are attached to a straight pipe made of a polyolefin-based material, and a process (construction method) for obtaining such a piping structure.

BACKGROUND ART

There are conventional processes well known in the art, in which an existing pipe is cut by a cutting tool to form an opening without disrupting the flow of a fluid through the existing pipe, and a gate valve body is inserted into the line of the existing pipe through the opening (see first and second patent documents). Where the straight pipe is a polyethylene (PE) pipe, it is proposed in the art to also form a sealing case from PE and weld it to the straight pipe.

CITATION LIST

Patent Document

[FIRST PATENT DOCUMENT] JP2000-19779 A (Abstract)
[SECOND PATENT DOCUMENT] JP2004-69059 A (Abstract)
[THIRD PATENT DOCUMENT] WO2011/099398 A (Front page)
[FOURTH PATENT DOCUMENT] JP2004-245397 A (Abstract)

SUMMARY OF INVENTION

However, forming the entire sealing case from PE will increase the mold cost and increase the number of portions to be welded.

Therefore, an object of the present invention is to realize a piping structure and a process therefor in which a valve, etc., are installed on a polyolefin-based straight pipe, wherein the number of portions to be welded is reduced.

In a first aspect, a piping structure of the present invention includes:
  a straight pipe 1 made of a polyolefin-based material;
  a pair of ridges 15 made of a polyolefin-based material, extending in a circumferential direction R along an outer surface 13 of the straight pipe 1, and spaced apart from each other in an axial direction S of the straight pipe 1;
  a piping material 2 including a plurality of metal-made separate cases 21 and 22, which are separated from each other in the circumferential direction R of the straight pipe 1 and enclose a portion of the straight pipe 1; and
  a pair of engagement portions 23 formed on at least one of the separate cases 21 and 22 and engaging respectively with the pair of ridges 15.

In the present invention, since the polyolefin-based straight pipe 1 is flexible, when a force acting upon the straight pipe 1 urges the opening of the straight pipe 1 to expand, the engagement portions 23 engage with the ridges 15, thereby preventing the opening from expanding.

In the present invention, it is only the portion of the pair of ridges 15 that requires to be welded. This results in fewer portions to be welded.

In a second aspect, a piping structure of the present invention includes:
  a straight pipe 1 made of a polyolefin-based material;
  a pair of engagement second grooves 1G extending in a circumferential direction R along an outer surface 13 of the straight pipe 1, and spaced apart from each other in an axial direction S of the straight pipe 1;
  a piping material 2 including a plurality of metal-made separate cases 21 and 22, which are separated from each other in the circumferential direction R of the straight pipe 1 and enclose a portion of the straight pipe 1;
  a pair of engagement portions 23 formed on at least one of the separate cases 21 and 22 and engaging respectively with the pair of engagement second grooves 1G;
  a bottomed first groove G formed on the outer surface 13 of the straight pipe 1 between the pair of engagement grooves 1G and extending in the circumferential direction R of the straight pipe 1;
  a knife gate 4, which is a portion of the piping material 2, for cutting through a bottom 1S of the bottomed first groove G; and
  an accommodating portion 45, which is a portion of the piping material 2, for accommodating the knife gate 4 in a valve-open state.

In this case, the engagement portions 23 of the separate cases 21 and 22 engage with the pair of engagement second grooves 1G. Thus, there is no need to weld the cases to the straight pipe.

Moreover, the bottomed first groove G is formed, and it is easy for the knife gate 4 to cut through the thin bottom 1S. Moreover, the bottom 1S prevents shavings produced from cutting from entering the straight pipe 1.

In the present invention, a polyolefin-based material refers to polyethylene, polypropylene, polybutene, etc.

BRIEF DESCRIPTION OF THE DRAWINGS

FIG. 1A and FIG. 1B are a transverse sectional view and a longitudinal sectional view, respectively, showing an example of a step in a process according to the present invention.

FIG. 2A and FIG. 2B are a transverse sectional view and a longitudinal sectional view, respectively, showing another example of a step in a process according to the present invention.

FIG. 4A and FIG. 4B are a transverse sectional view and a longitudinal sectional view, respectively, showing an example of a step in a process according to the present invention.

FIG. 5A and FIG. 5B are a transverse sectional view and a longitudinal sectional view, respectively, showing an example of a step in a process according to the present invention. Note that only the welded portion is hatched in FIG. 5A and FIG. 5B.

FIG. 17A and FIG. 17B are a longitudinal sectional view and a transverse sectional view, respectively, showing a cutting tool and a cutter according to Embodiment 2.

FIG. 18A and FIG. 18B are a longitudinal sectional view and a transverse sectional view, respectively, showing a skin formation step of Embodiment 2.

DESCRIPTION OF EMBODIMENTS

Figure 3A:
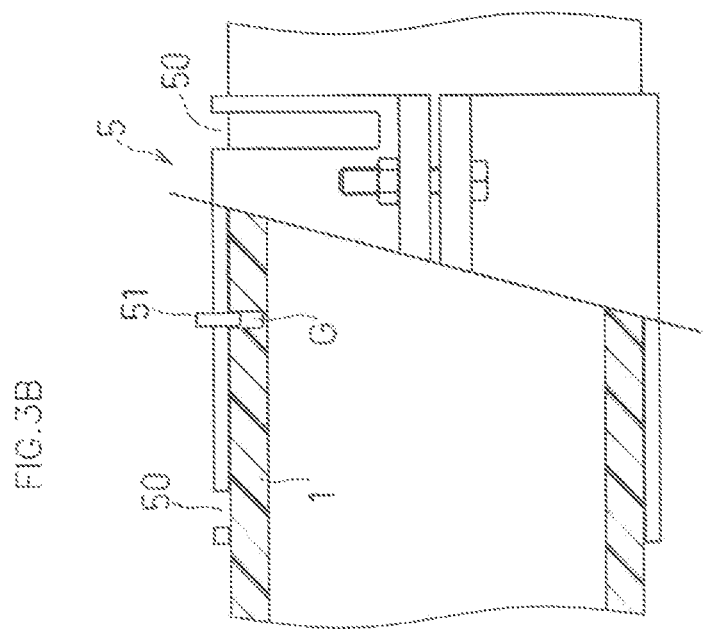
FIG. 3A and FIG. 3B are a transverse sectional view and a longitudinal sectional view, respectively, showing an example of a step in a process according to the present invention.

In the first aspect, the piping structure preferably includes:
a bottomed first groove G formed on the outer surface 13 of the straight pipe 1 between the pair of ridges 15 and extending in the circumferential direction R of the straight pipe 1;
a knife gate 4, which is a portion of the piping material 2, for cutting through a bottom 1S of the bottomed first groove G; and
an accommodating portion 45, which is a portion of the piping material 2, for accommodating the knife gate 4 in a valve-open state.

In this case, the knife gate 4 can cut through the bottom 1S of the first groove and further bite into the inner periphery surface 14 of the straight pipe 1, thereby disrupting water through the pipeline.

In the first aspect, a preferred process includes:
a step of arranging a curved rod-shaped piece P along the outer surface 13 of the straight pipe 1, wherein the piece P extends in the circumferential direction S and is to be the pair of ridges 15;
a step of heating the piece P to weld the piece P to the straight pipe 1; and
a step of attaching the piping material 2 to the straight pipe 1.

In this case, there is no need to weld the entire piping material 2 to the straight pipe 1.

More preferably, the process includes:
a step of arranging a curved rod-shaped piece P along the outer surface 13 of the straight pipe 1, wherein the piece P extends in the circumferential direction S and is to be the pair of ridges 15;
a step of heating the piece P to weld the piece P to the straight pipe 1;
a step of cutting the straight pipe 1 to form the bottomed first groove G on the straight pipe 1; and
a step of attaching the separate cases 21 and 22 to the straight pipe 1 so that the piping material 2 accommodating the knife gate 4 therein encloses a portion of the straight pipe 1 including the bottomed first groove G and the knife gate 4 opposes the bottomed first groove G.

In this case, the bottomed first groove G is formed, and it is easy for the knife gate 4 to cut through the thin bottom 1S. Moreover, the bottom 1S prevents shavings produced from cutting from entering the straight pipe 1.

In the second aspect, a preferred process includes:
a step of cutting the straight pipe 1 to form the pair of engagement second grooves 1G on the outer surface 13 of the straight pipe 1; and
a step of cutting the straight pipe 1 to form the bottomed first groove G on the straight pipe 1.

In this case, there is no need to weld the piece to the straight pipe 1. Thus, it is possible to perform a piping operation more easily and at a lower cost.

A more preferred process includes:
a step of attaching a rotating unit, which is rotatable in a circumferential direction R of the straight pipe 1, around the straight pipe 1, wherein a cutter 32 having a milling-like cutting tool 3 is attached to the rotating unit;
a skin formation step of revolving the cutting tool 3 in a circumferential direction R of the straight pipe 1 together with the rotating unit while rotating the milling-like cutting tool 3 about a central axis 30 of the tool, thereby cutting an outer surface 13 of the straight pipe 1 to form, on the straight pipe 1, a bottomed first groove G, which is elongated in the circumferential direction R;
a step of cutting the straight pipe 1 to form the pair of engagement second grooves 1G on the outer surface of the straight pipe 1;
a step of removing the rotating unit and the cutter 32 from the straight pipe 1; and
a step of attaching the separate cases 21 and 22 to the pipe 1 so that the piping material 2 accommodating the knife gate 4 therein encloses a portion of the straight pipe 1 including the bottomed first groove G and the knife gate 4 opposes the bottomed first groove G.

In this case, the cutting tool 3 is used to form the bottomed first groove G, instead of forming an opening in the straight pipe 1. Therefore, shavings T produced when cutting the straight pipe 1 with the cutting tool 3 will not enter the pipe 1.

On the other hand, the bottom of the first groove G is formed as a skin 1S. Therefore, by thrusting through the skin 1S, it is possible to form the opening 10 without producing the shavings T.

In this case, with the milling-like cutting tool 3, it is possible to form the bottomed first groove G with a high precision. Moreover, by revolving the cutting tool 3 together with the case 20, the milling-like cutting tool 3 can form the bottomed first groove G with an even higher precision. Therefore, the skin 1S can be set to any thickness, and it is possible to easily break the skin 1S with the blade while sealing the fluid in the straight pipe 1.

Any feature illustrated and/or depicted in conjunction with one of the aspects described above or the following embodiments may be used in the same or similar form in one or more of alternative aspects or alternative embodiments, and/or may be used in combination with, or in place of, any feature of the alternative aspects or embodiments.

EMBODIMENTS

The present invention will be understood more clearly from the following description of preferred embodiments taken in conjunction with the accompanying drawings. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Embodiments of the present invention will now be described with reference to the drawings.

First, a general configuration of a piping structure will be described.

Piping Material 2:

The piping material 2 shown in FIG. 7 to FIG. 10 may be used for enclosing an existing pipe while a fluid (e.g., water, etc.) is flowing through an existing pipe and for insertion of a valve body, etc., without disrupting the flow, but it may be installed on a new straight pipe 1. In this example, the piping material 2 is a gate valve.

Figure 7:
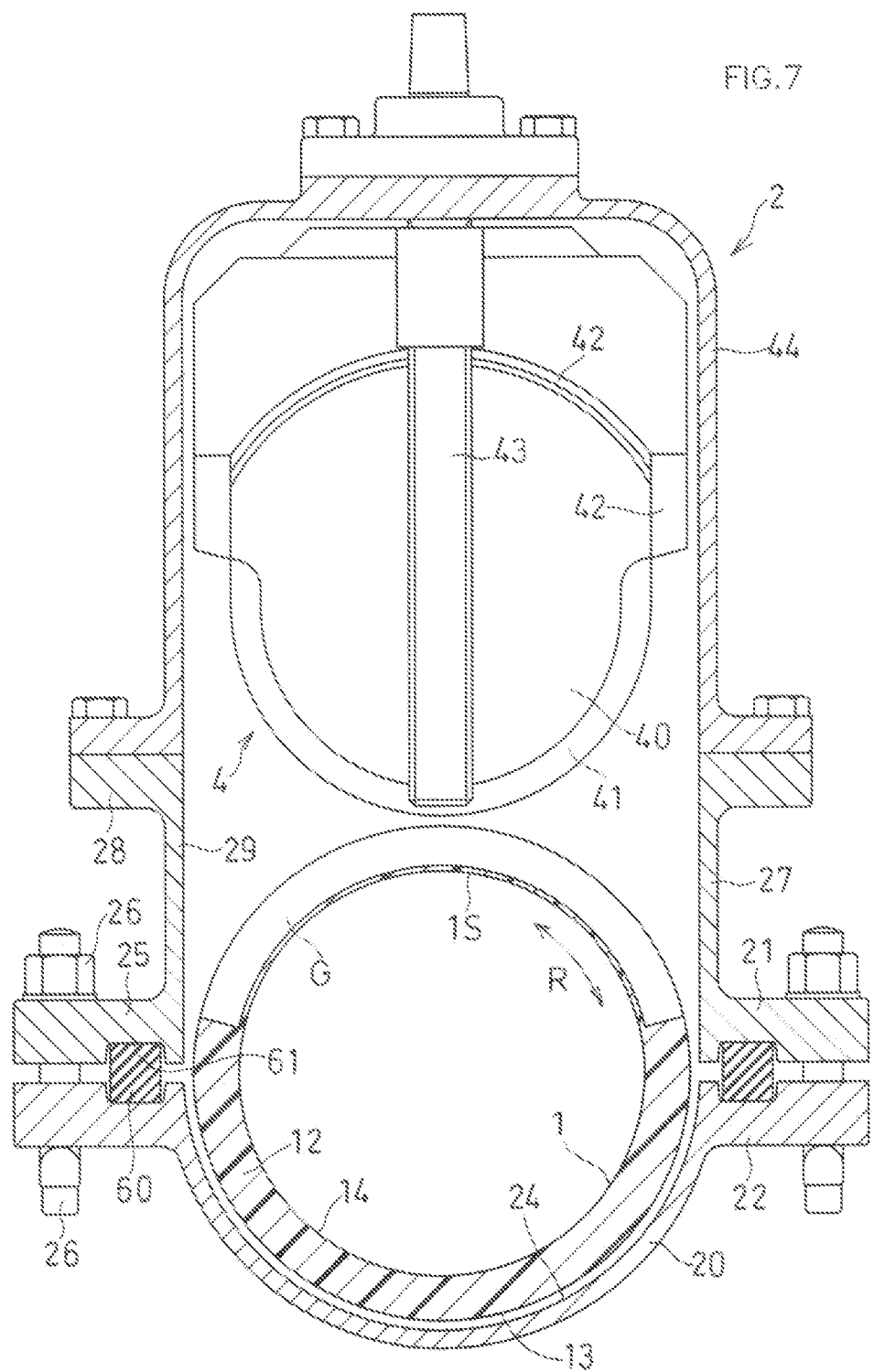
FIG. 7 is a transverse sectional view showing an example of a piping structure.
Figure 8:
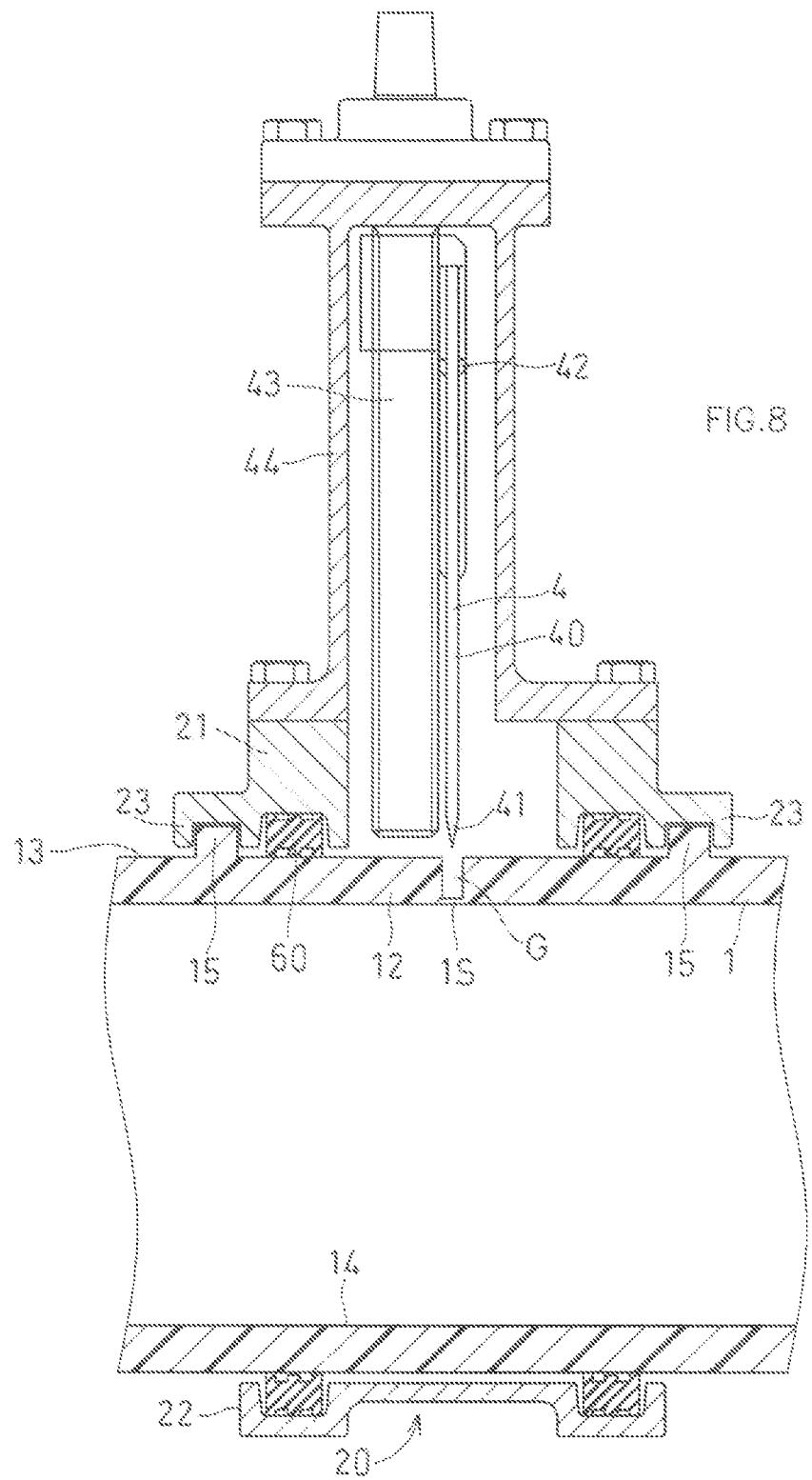
FIG. 8 is a longitudinal sectional view showing the piping structure.

Separate Cases 21 and 22:

As shown in FIG. 7 and FIG. 8, the piping material 2 includes a sealing case 20. The sealing case 20 includes two separate cases 21 and 22 enclosing a portion of the straight pipe 1.

The first and second separate cases 21 and 22 are separated from each other along a virtual plane that is generally orthogonal to a branch pipe portion 27. The pair of separate cases 21 and 22 are attached on the outside of the straight pipe 1 from the pipe radial direction of the straight pipe 1 and are assembled together by fastening coupling portions 25 of the separate cases 21 and 22 to each other with assembly bolts/nuts 26. Note that at the coupling portions 25, the separate cases 21 and 22 are preferably in metal touch contact with each other.

As shown in FIG. 7, the separate cases 21 and 22 each have an inner periphery surface 24 which is curved along an outer surface 13 of the straight pipe 1. The branch pipe portion 27 having a branch-shaped branch hole 29 protruding in the radial direction of the straight pipe 1 is formed integral with the first separate case 21 of the plurality of separate cases 21 and 22 shown in FIG. 7.

Branch Pipe Portion 27:

A flange 28, e.g., a plate-shaped flange, is formed integral with the branch pipe portion 27, and a valve cover 44 shown in FIG. 7, etc., are attached to the flange 28.

A knife gate 4 of FIG. 7 and FIG. 8 is accommodated in the sealing case 20.

As shown in FIG. 7 and FIG. 8, a packing attachment portion 61 is formed on the inner surface of the separate case 21 (22). The rubber packing 60 shown in FIG. 8 is attached to the packing attachment portion 61, and the gap between the existing pipe 1 and the sealing case 20 is sealed by the rubber packing 60 as shown in FIG. 7 and FIG. 8.

As shown in FIG. 7, the present piping structure is a piping structure including a gate valve body (knife gate) 4 assembled into the straight pipe 1. The straight pipe 1 has a first groove G. The first groove G has a bottom that extends in the circumferential direction R and is formed as a skin 1S. The first groove G can be formed by a fraise- or endmill-like cutting tool. Note that a portion of the straight pipe 1 including the first groove G is enclosed by the case 20 of FIG. 8.

The present piping structure of FIG. 7 includes the straight pipe 1, the case 20, the knife gate 4 and a valve rod 43. The case 20 of the present piping structure includes the valve cover 44 in addition to the first and second separate cases 21 and 22.

In the valve-open state shown in FIG. 7, the valve cover 44 accommodates a portion of the knife gate 4. That is, the valve cover 44 is a portion of the case 20, and the valve cover 44, the first separate case 21 and the second separate case 22 accommodate the knife gate 4. Note that the valve cover 44 is coupled to the first separate case 21 with the flange 28 therebetween.

Figure 10:
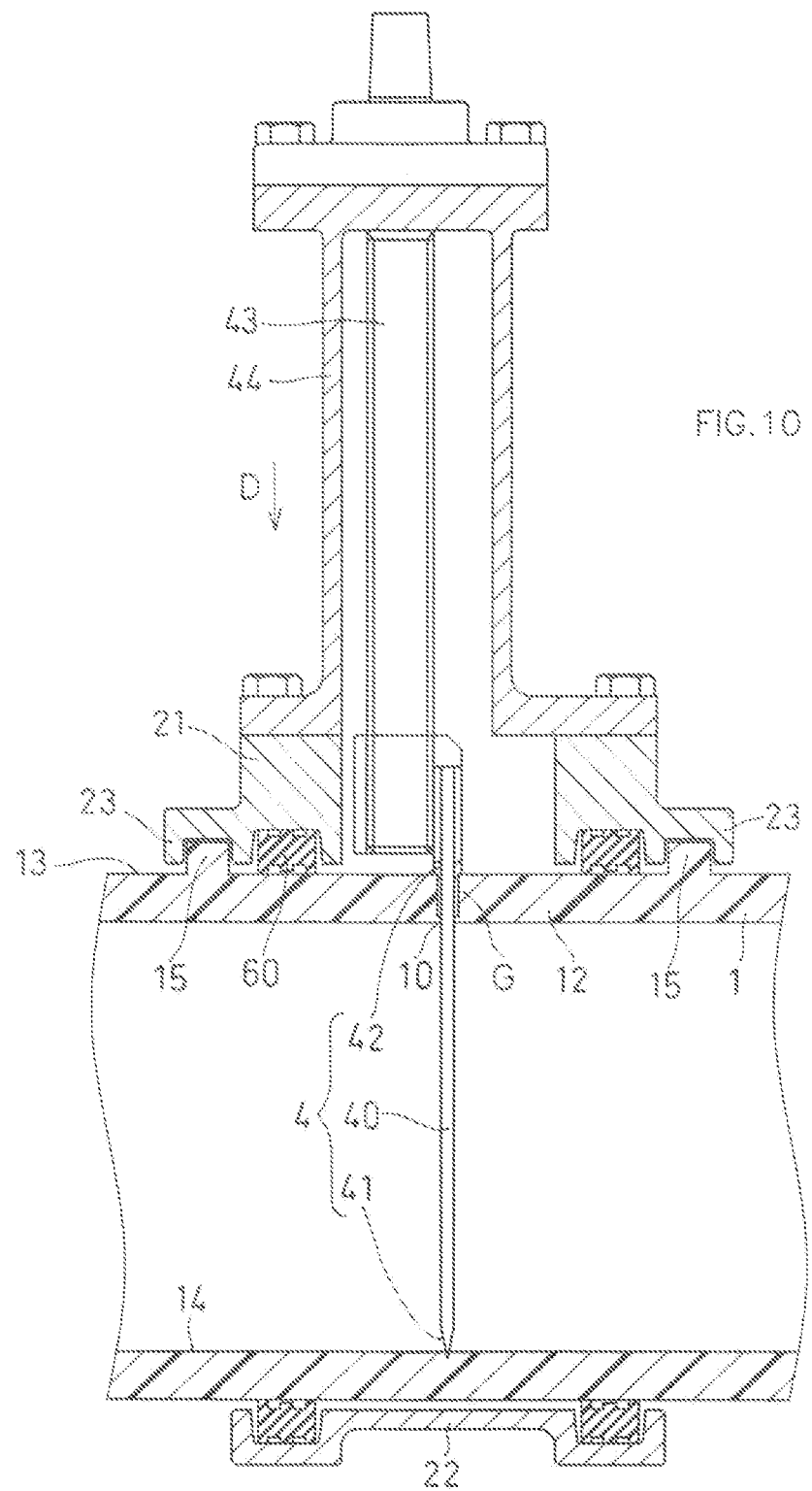
FIG. 10 is a longitudinal sectional view showing the piping structure.

The valve rod 43, when rotated, brings the knife gate 4 closer toward the first groove G and further moves the knife gate 4 in the pipe radial direction D so as to thrust through the skin 1S of the first groove G to form an opening 10 of FIG. 10.

Figure 15:
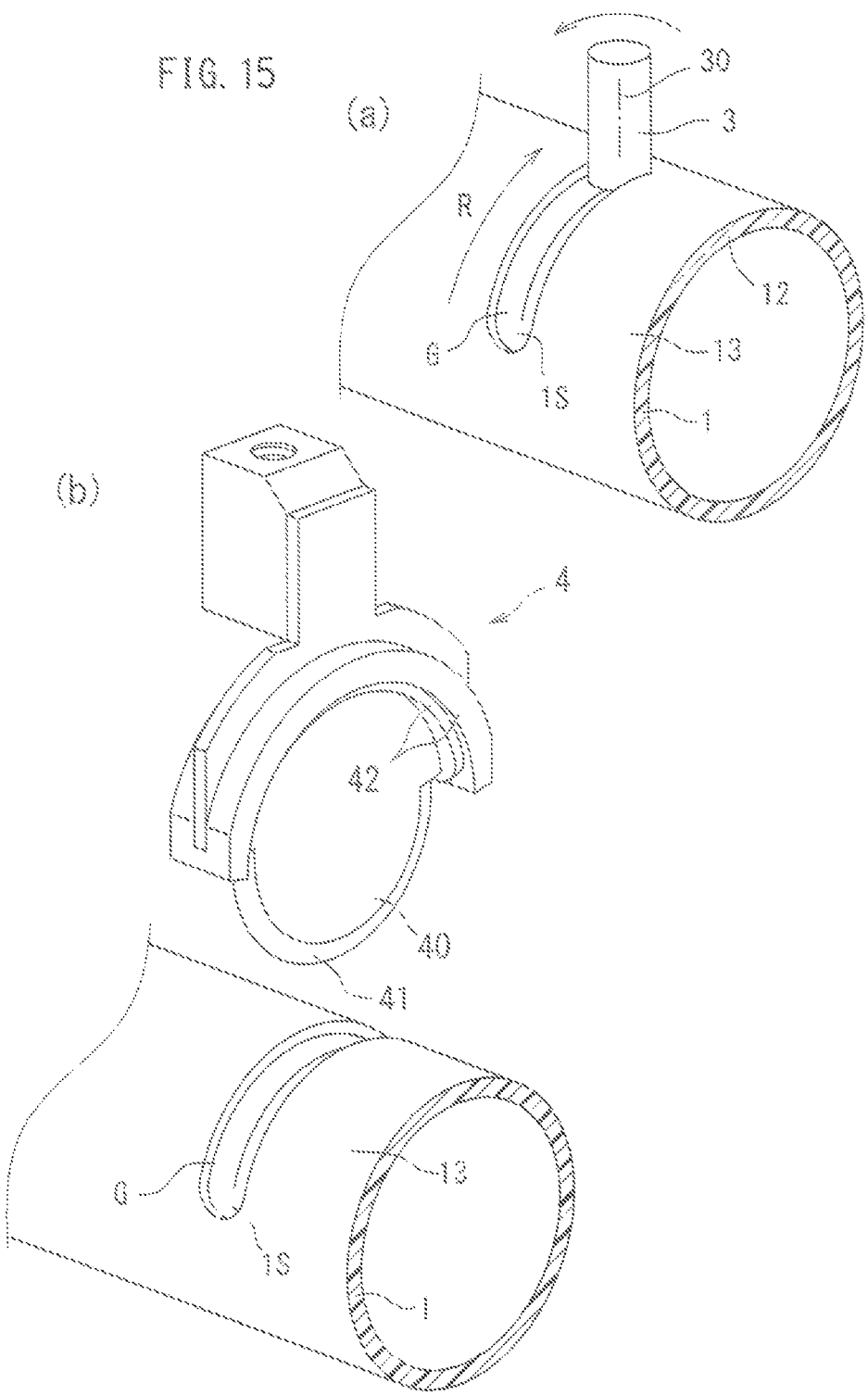
FIG. 15 is a schematic perspective view showing a step in a process according to another example.
Figure 16:
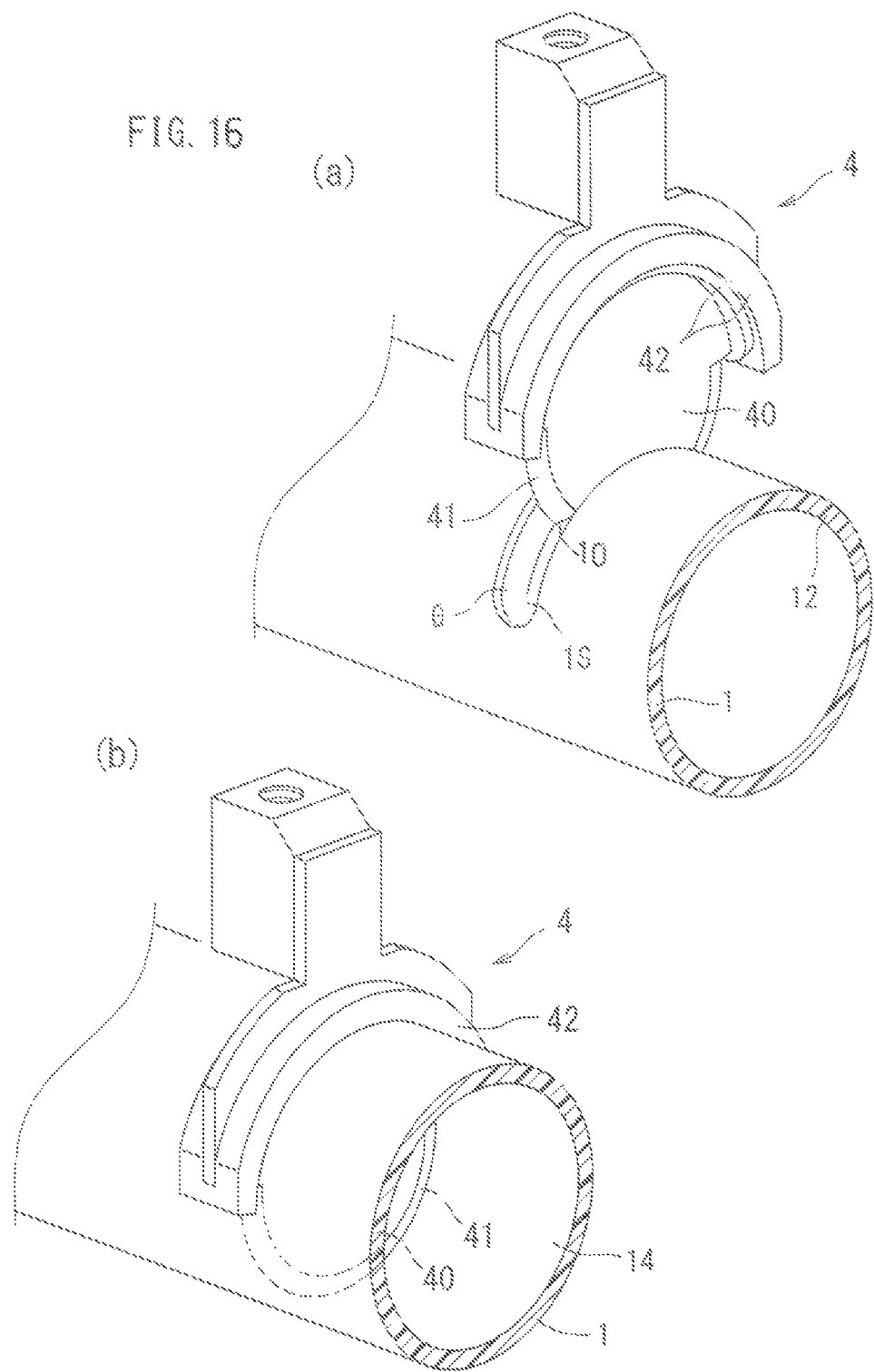
FIG. 16 is a schematic perspective view showing a step in the process according to the example.

As shown in FIG. 15 and FIG. 16, the knife gate 4 has a circular knife shape, and includes a valve main body 40, a blade 41 and a seal portion 42.

The valve main body 40 of FIG. 15 and FIG. 16 is a circular portion that enters the inside of the straight pipe 1. The blade 41 is made of metal and is provided on the distal end side of the valve main body 40 for breaking the skin 1S to form the opening 10. The seal portion 42 of FIG. 15 is made of rubber, provided on the proximal end side, opposite to the distal end side, and contacts a portion of the straight pipe 1 around the first groove G to shut the opening 10.

With the knife gate 4 in the valve-closed state, the metal-made blade 41 contacts the inner periphery surface 14 of the straight pipe 1, and the rubber-made seal portion 42 contacts a portion of the straight pipe 1 around the first groove G.

A pair of ridges 15 and 15 are formed integral with the straight pipe 1 made of a polyolefin-based material of FIG. 8. The pair of ridges 15 are similarly made of a polyolefin-based material, extend over half the circumference, for example, in the circumferential direction R along an outer surface 13 of the straight pipe 1, and the two ridges 15, 15 are spaced apart from each other in the axial direction S of the straight pipe 1.

The sealing case 20 (the separate cases 21 and 22) of the piping material 2 of FIG. 8 is made of a metal, e.g., made of FCD or made of a steel plate. A pair of engagement portions 23 that engage respectively with the pair of ridges 15 are formed on the first separate case 21. The engagement portion 23 is formed as a pair of ridges that engage with a ridge 15.

Next, a process for obtaining the piping structure will be described.

As shown in FIG. 2A and FIG. 2B, a cutter having the endmill-like cutting tool 3 is used, and the cutting tool 3 is moved toward the center of the straight pipe 1, thereby shaving a portion of a pipe wall 12 of the straight pipe 1 with the cutting tool 3. While in this state, the entire structure is rotated in the circumferential direction R as shown in FIG. 2A while rotating the cutter together with the cutter case (not shown), thereby forming a bottomed groove G over generally half the circumference, wherein the bottomed groove G is obtained by cutting a portion of the straight pipe 1 as shown in FIG. 2A and FIG. 2B.

That is, in the skin formation step of FIG. 2A to FIG. 2B, the outer surface 13 of the straight pipe 1 is cut with the cutting tool 3 to form, on the straight pipe 1, the first groove G having, as its bottom, the skin 1s which is the inner surface of the straight pipe 1.

In the present example, first, the cutting tool 3 is fed toward the center of the straight pipe 1 so that the cutting tool 3 does not penetrate through the straight pipe 1 while the cutting tool 3 is rotated about the central axis 30, as shown in FIG. 2B and FIG. 15(a). Then, the cutting tool 3 is revolved, together with the cutter case (not shown), in the circumferential direction R of the straight pipe 1, while rotating the milling-like cutting tool 3 about the central axis 30 of the tool, thereby forming the bottomed first groove G over generally half the circumference in the circumferential direction R, for example, which is elongated in the circumferential direction R, thus performing the skin formation step.

Note that in the skin formation step, the depth to which cutting is done by the cutting tool 3 needs to be smaller than the thickness of the straight pipe 1 so that the first groove G has a bottom.

The bottomed first groove G may be formed by using a fraise-like cutting tool 3 of FIG. 1A and FIG. 1B.

Figure 3B:
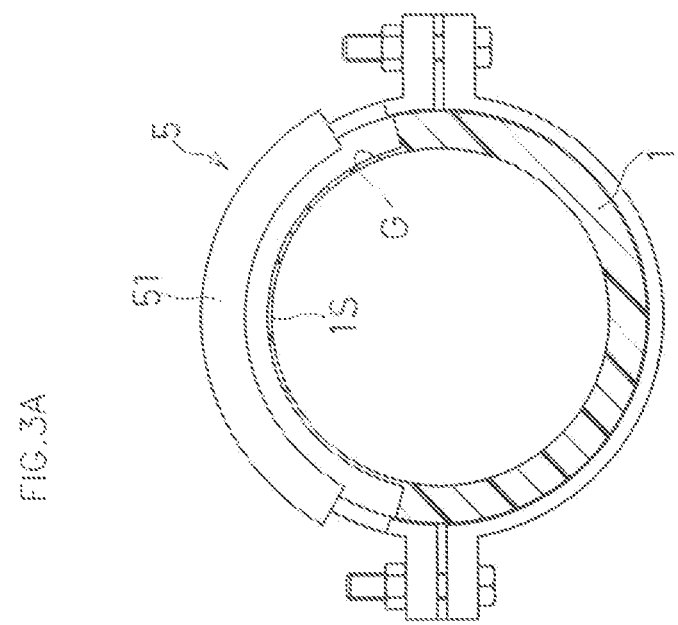

After the skin formation step, a positioning jig 5 is fixed to the straight pipe 1, as shown in FIG. 3A and FIG. 3B. The positioning jig 5 includes a positioning portion 51 that fits into the first groove G and a pair of arrangement holes 50.

After the positioning jig 5 is fixed, a pair of curved rod-shaped pieces P are arranged along the outer surface 13 of the straight pipe 1 by being fitted into the pair of arrangement holes 50, as shown in FIG. 4A and FIG. 4B. Note that a heating wire (not shown) is buried in each piece P.

After the arrangement of the pieces P, as shown in FIG. 5A and FIG. 5B, electric power is fed to the heating wire so as to weld the pieces P to the straight pipe 1 via the heating wire.

That is, the pieces P and the straight pipe 1 are made of the same type of polyethylene, and are welded together by being heated. For this welding, a welder for heating and welding the pieces P and the straight pipe 1 may be used.

Figure 6A:
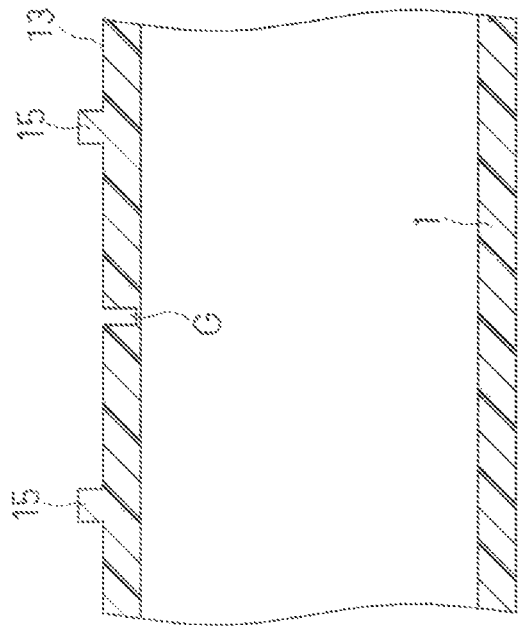
FIG. 6A and FIG. 6B are a transverse sectional view and a longitudinal sectional view, respectively, showing an example of a step in a process according to the present invention.
Figure 6B:
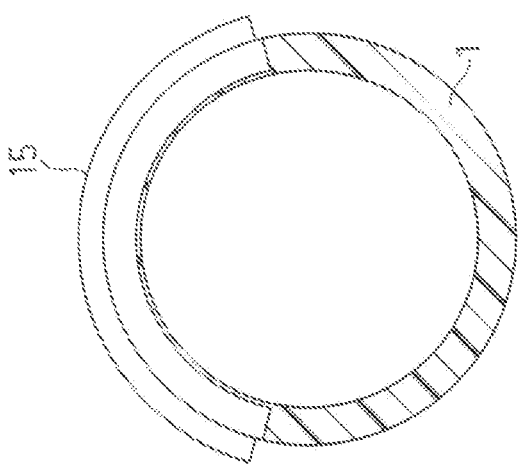

Thus, as shown in FIG. 6A and FIG. 6B, the arc-shaped bottomed first groove G and a pair of ridges 15 extending in the circumferential direction R are formed on the straight pipe 1.

Assembly Step:

Thereafter, as shown in FIG. 7 and FIG. 8, a portion of the straight pipe 1 is airtightly enclosed by the sealing case 20.

Note that the coupling portions 25 of the separate cases 21 and 22 are fastened by the bolts/nuts 26, thereby airtightly enclosing a portion of the straight pipe 1 with the sealing case 20.

During the assembly, as shown in FIG. 7, the valve cover 44 is attached to the flange 28 of the first separate case 21 in advance. The knife gate 4, which can enter the straight pipe 1, is accommodated in the valve cover 44. Thus, the knife gate 4 is installed on the straight pipe 1.

Figure 9:
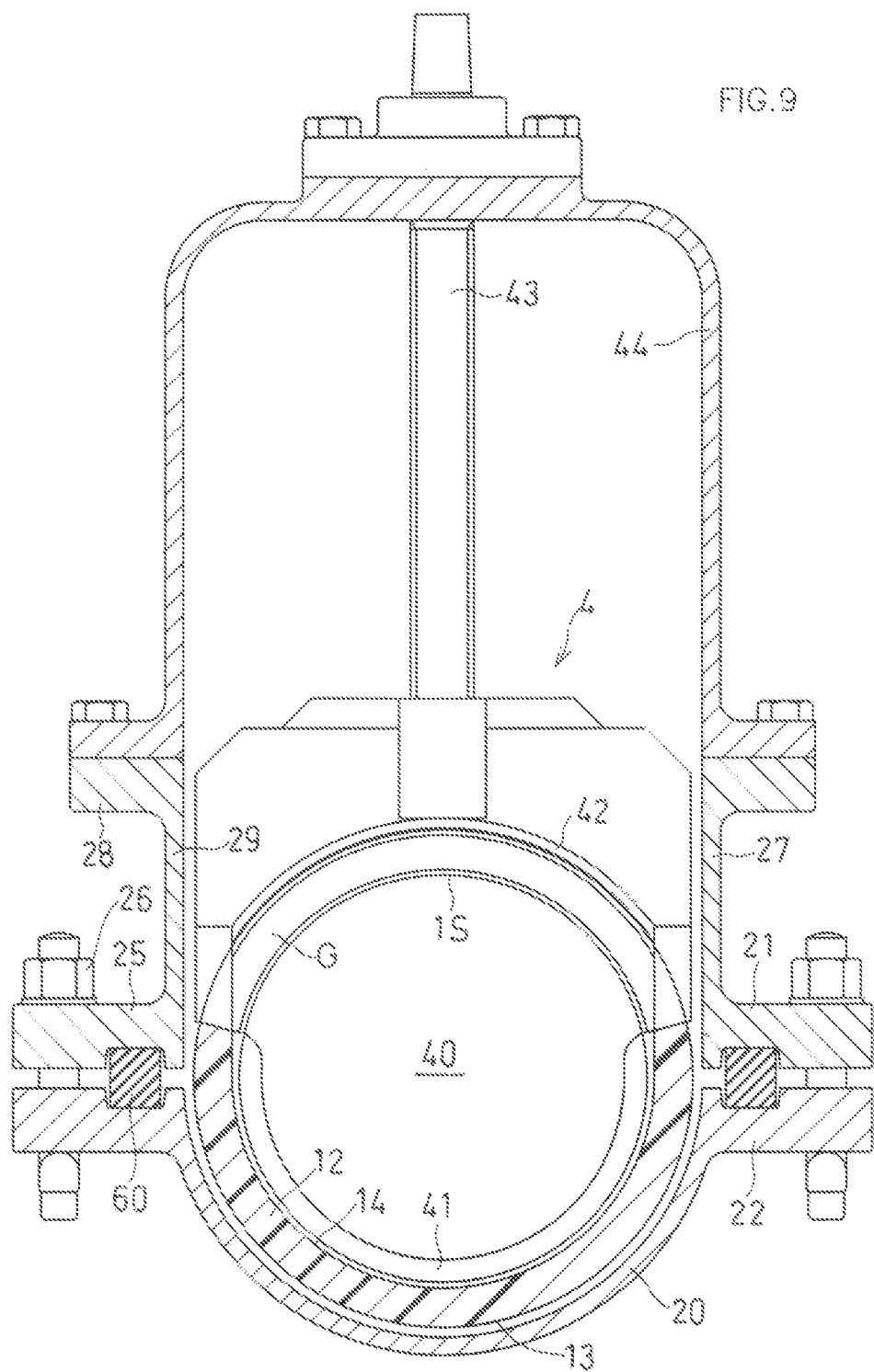
FIG. 9 is a transverse sectional view showing the piping structure.

Opening Formation Step:

After installment, the opening formation step of breaking the skin 1S to form the opening 10 is performed as shown in FIG. 9 to FIG. 10. In the present example, the blade 41 of the knife gate 4 thrusts through the skin 1S to form the opening 10, and the valve main body 40 further reams the opening 10.

Figure 11:
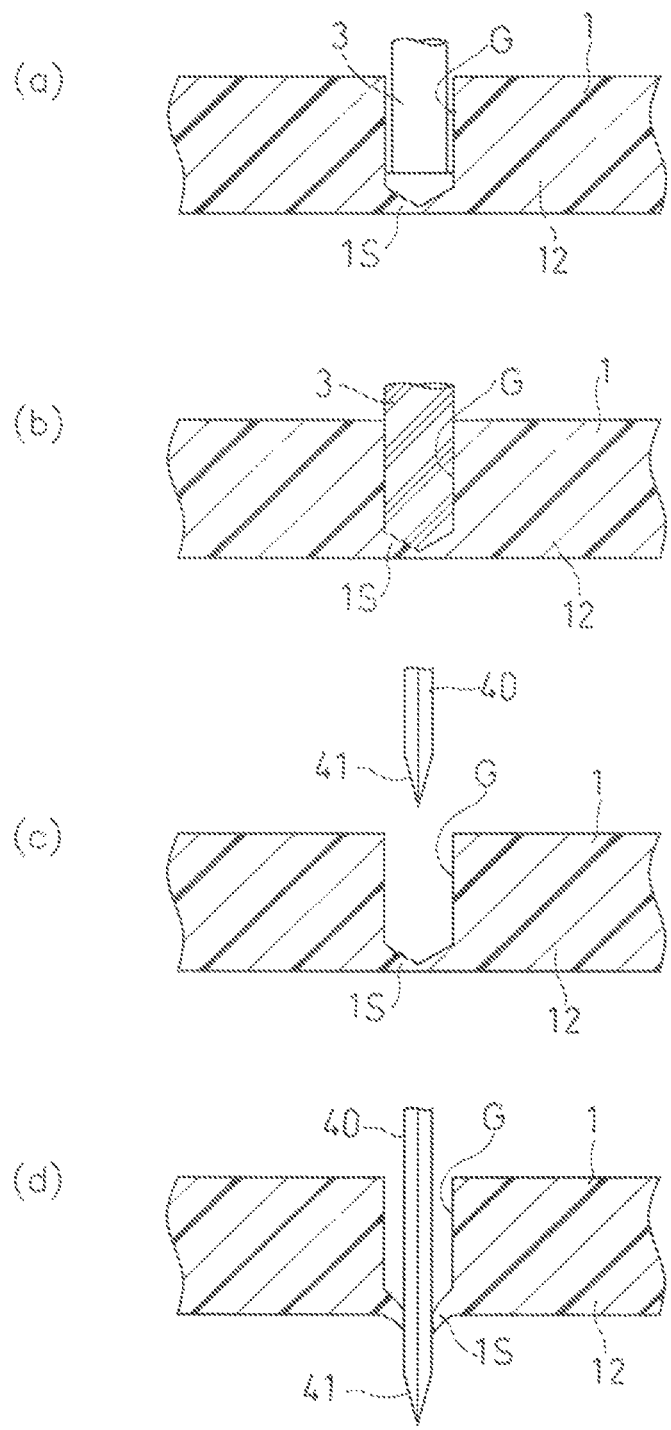
FIG. 11 is a cross-sectional view showing a bottomed first groove and a valve body, etc.

In the present example of FIG. 11, the first groove G extends in the circumferential direction R of the straight pipe 1, and the skin 1S may be formed so that the thickness of a central portion thereof in the pipe axial direction S is thinner than the opposite side portions thereof in the pipe axial direction S, as shown in FIG. 11(c). The blade 41 breaks the thin central portion, thus performing the step of forming the opening 10.

In the opening formation step, as the valve rod 43 of FIG. 7 and FIG. 8 is rotated, the blade 41 of FIG. 11 first comes into contact with the skin 1S of the straight pipe 1 to cut open the portion as shown in FIG. 11(d). Then, the blade 41 further cuts open the skin 1S, and the blade 41 cuts open the opposite sides of the straight pipe 1 until the blade 41 contacts the inner periphery surface 14 of the straight pipe 1 as shown in FIG. 10.

Insertion Step:

That is, as shown in FIGS. 11(c) to 11(d), in the opening formation step, the blade 41 cuts open the skin 1S, the blade 41 pushes open and breaks the skin 1S, and the valve main body 40 enters the straight pipe 1 together with the blade 41. In the present example, the insertion step of inserting the knife gate 4 into the straight pipe 1 is performed together with the opening formation step.

Then, when the valve rod 43 of FIG. 9 and FIG. 10 is further screwed in, the sharp metal-made blade 41, which is already in contact with the inner periphery surface 14, does not substantially advance, and the blade 41, which is integral with the valve main body 40, bites into the inner periphery surface 14 of the PE-made straight pipe 1, thereby sealing the structure.

At the same time, the seal portion 42 on the proximal end side of the valve main body 40 of FIG. 10 enters the opening 10 to come into contact with the portion of the straight pipe 1 around the opening 10, thereby sealing the portion of the opening 10.

As described above, the valve main body 40 of the knife gate enters the straight pipe 1, and the seal portion 42 contacts the portion of the straight pipe 1 around the opening 10 and the distal end side of the valve main body 40 contacts the inner periphery surface 14 of the straight pipe 1, thus performing the insertion step.

By the insertion step, the knife gate 4 is inserted to shut the pipeline of the straight pipe 1 and disrupt water as shown in FIG. 9 and FIG. 10. After the water disruption, work is performed on the downstream side of the straight pipe 1. Then, the operation portion of the valve rod 43 is rotated in the reverse direction, as necessary, thereby retracting the knife gate 4 from the inside of the straight pipe 1 as shown in FIG. 7.

With the piping structure of FIG. 10 thus obtained, even if the opening 10 is urged to expand from the original size, it is possible to prevent the opening 10, even if it is a PE pipe, from expanding because the engagement portion 23 is in engagement with the pair of ridges 15.

Note that the opening 10 may be a circular opening for branch piping, for example.

Now, the knife gate 4 does not require an elastomer-made seal portion (42). That is, as shown in FIG. 10, when the valve main body 40 enters the straight pipe 1, the skin 1S of the straight pipe 1 comes into contact with the valve main body 40. Since the skin 1S is an elastomer, the gap with the metal-made valve main body 40 will be sealed even without the seal portion 42.

When the work is done without disrupting the water supply, water pressure in the straight pipe 1 acts upon the skin 1S. Therefore, the thickness of the skin 1S may preferably be about 3 mm to about 5 mm. The angle of the tip of the cutting tool 3 may preferably be about 120° to about 160°.

The blade 41 of the knife gate 4 may be formed so that the knife gate 4 bites into the straight pipe 1 at the opposite ends of the opening 10 of the straight pipe 1, as well as along the circumferential portion of the straight pipe 1 to be in contact with the inner periphery surface 14.

Figure 12:
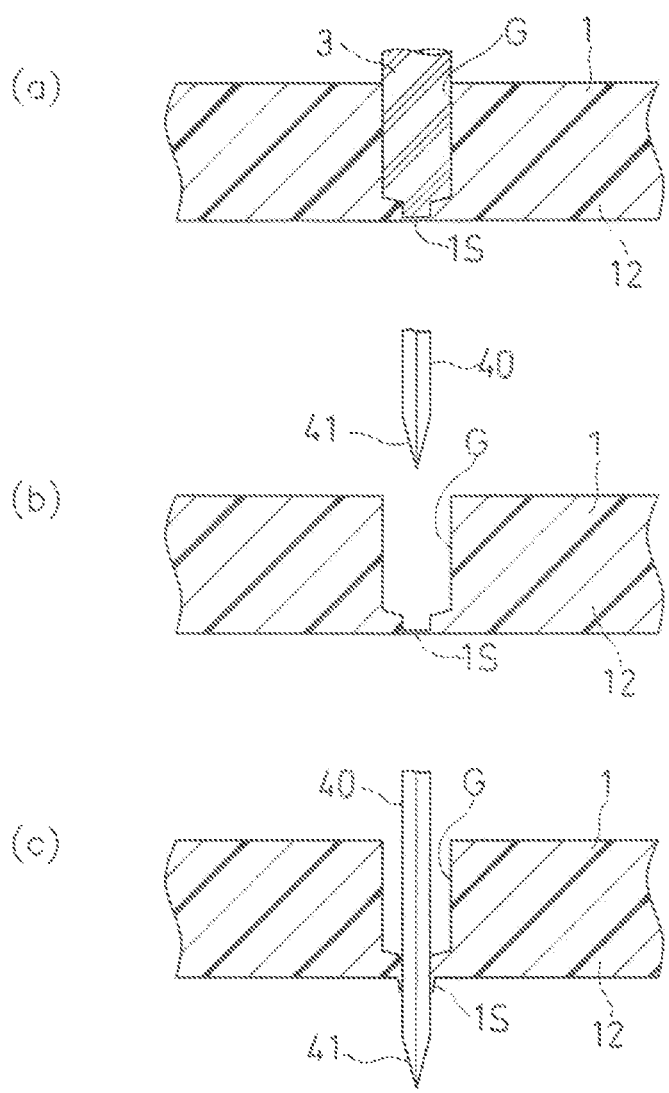
FIG. 12 is a cross-sectional view showing a bottomed first groove and a valve body, etc.

As shown in FIG. 12(a), a stepped endmill-like cutting tool 3 may be used to cut the straight pipe 1, thereby forming a stepped first groove G as shown in FIG. 12(b).

When forming the first groove G on a new straight pipe 1, the thickness of the skin 1S may be about 0.3 mm to about 0.5 mm. When the skin 1S is thin, the cut surface of the stepped groove G and the valve main body 40 may contact each other, thereby achieving sealing therebetween.

Now, the cutting step of FIG. 1A to FIG. 2B may be performed by attaching a cutter to the sealing case 20, and rotating the cutting tool 3 together with the sealing case 20.

The piece P for welding of FIG. 4A may be welded to the straight pipe 1 while it is attached to and positioned on the sealing case 20. That is, the welding of the piece P may be performed after the cutting step and the assembly step.

Figure 13:
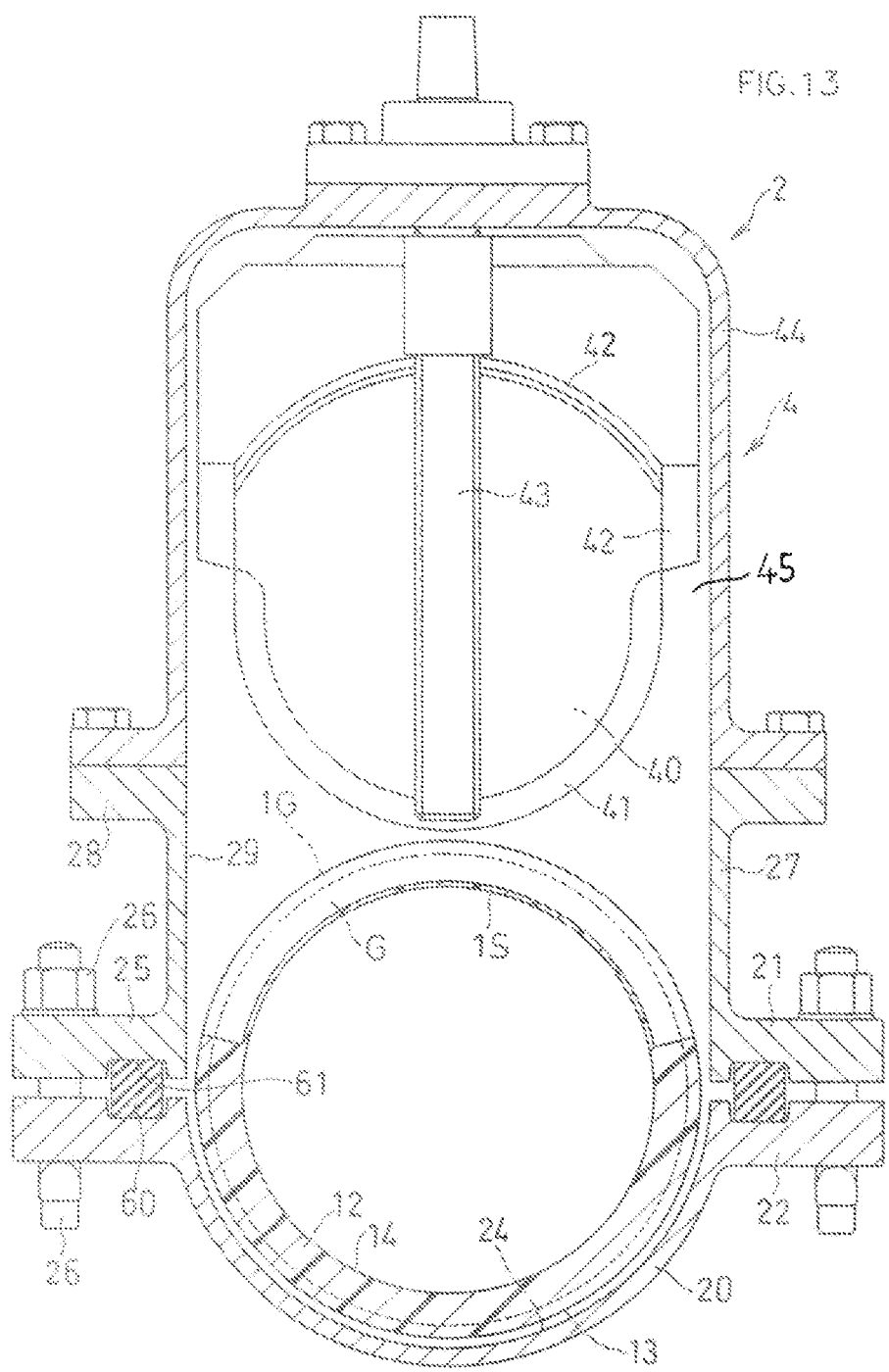
FIG. 13 is a transverse sectional view showing another piping structure.
Figure 14:
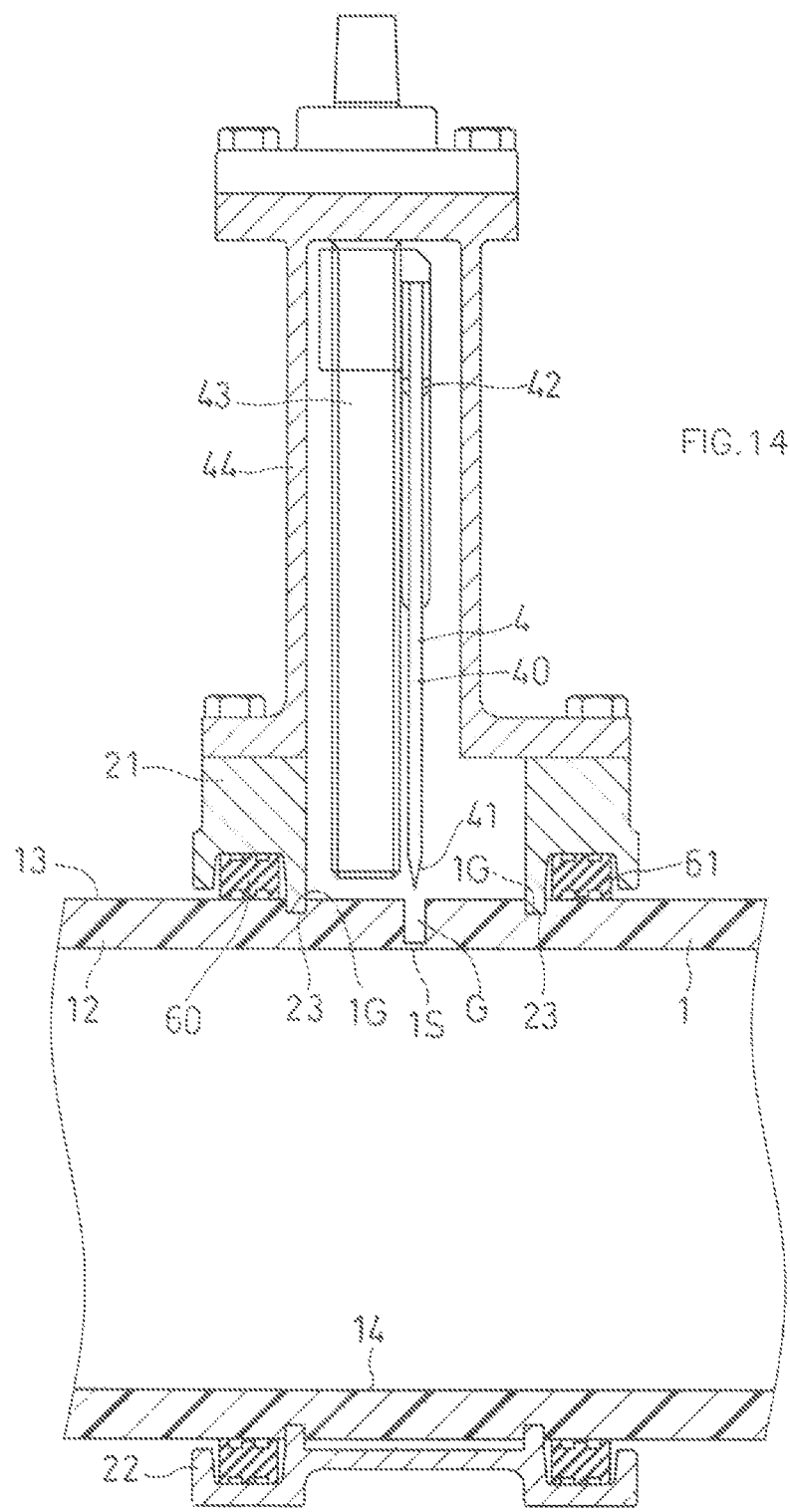
FIG. 14 is a longitudinal sectional view showing the same.

FIG. 13 and FIG. 14 show another example of the piping structure.

In this example, instead of forming the ridges 15 (FIG. 8), a pair of engagement second grooves 1G are formed, wherein the second grooves 1G extend over the entire circumference in the circumferential direction R along the outer surface 13 of the straight pipe 1 of FIG. 13 and are spaced apart from each other in the axial direction S of the straight pipe 1 of FIG. 14. On the other hand, a pair of engagement portions (engagement projections) 23 are provided, wherein the engagement portions 23 are formed on both of the pair of separate cases 21 and 22 and engage with the respective engagement second grooves 1G. The engagement portions 23 are preferably engagement ridges continuous in the circumferential direction R.

In order to obtain the present piping structure, the straight pipe 1 is cut so as to form the pair of engagement second grooves 1G along the outer surface 13 of the straight pipe 1. Moreover, the straight pipe 1 is cut to form bottomed first grooves G on the straight pipe 1. Note that the depth of the first grooves G is deeper than the second grooves 1G.

The engagement second grooves 1G may be formed using a fraise-like or endmill-like cutting tool, as are the first grooves G, but may be formed using a bite-shaped cutting tool.

FIG. 17A to FIG. 18B show the cutting tool 3 and the cutter 32 according to another embodiment. In Embodiment 2, a rotating unit 2 different from the case 20 is used in the skin formation step, etc. It can be employed preferably also when installing a new pipe 1 to be the existing pipe 1. Particularly, it can be employed preferably when a new valve is installed in a continuous long polyethylene pipe.

In the present example, the rotating unit 2 includes a cutting base 2B, two roller chains 2C, four linkages 2D and four rollers 2R. The cutter 32 is attached to the base 2B.

As shown in FIG. 17B, the roller chains 2C and the rollers 2R are in contact with the outer circumference of the new pipe 1 to be the existing pipe 1, and the rotating unit 2 is rotatable in the circumferential direction R of the new pipe 1 or the existing pipe 1. The linkages 2D link together the roller chains 2C and the base 2B.

With the present structure, irrespective of the outer diameter of the new pipe 1 or the existing pipe 1, one type of the rotating unit 2 can accommodate many sizes.

Next, a process using the rotating unit 2 will be described.

First, as shown in FIG. 17B, the rotating unit 2 rotatable in the circumferential direction R of the new straight pipe 1 to be the existing pipe 1 is attached around the straight pipe 1. During the attachment, the cutter 32 having the milling-like cutting tool 3 is attached to a base 2B of the rotating unit 2.

Then, the cutting tool 3 is fed toward the center of the straight pipe 1 while the cutting tool 3 is rotated about the central axis 30. Thereafter, while the milling-like cutting tool 3 of FIG. 18B is rotated about the central axis 30 of the tool, the cutting tool 3 is revolved, together with the rotating unit 2, in the circumferential direction R of the straight pipe 1, thereby cutting the outer surface 13 of the straight pipe 1, and forming, on the straight pipe 1, the bottomed first groove G, which is formed as the skin 1S and elongated in the circumferential direction R, thus performing the skin formation step.

The rotating unit 2 and the cutter 32 are removed from the new pipe 1, and the surface of the straight pipe 1 is wiped with a cloth, or the like, to remove the shavings produced from cutting. After the rotating unit 2 of FIG. 18B is removed, the case 20, the valve cover 44 and the knife gate 4 of FIG. 13 and FIG. 14 are instead assembled to the straight pipe 1. Thus, the case 20 accommodating the knife gate 4 therein is attached to the straight pipe 1 so as to enclose the straight pipe 1 including the first groove G. In this process, the separate cases 21 and 22 are attached to the pipe 1 so that the piping material 2 accommodating the knife gate 4 therein encloses a portion of the straight pipe 1 including the bottomed first groove G and the knife gate 4 opposes the bottomed first groove G.

After performing the attachment step, the step of thrusting through the skin 1S to form the opening 10 is performed as necessary. That is, when it becomes necessary to disrupt water, the knife gate 4 is pushed toward the straight pipe 1 to form the opening 10 and insert the knife gate 4 into the straight pipe 1 as in FIG. 15(*b*) to FIG. 16(*b*).

While preferred embodiments have been described above with reference to the drawings, various obvious changes and modifications will readily occur to those skilled in the art upon reading the present specification.

For example, the tip of the endmill does not need to be pointed, but the endmill may be used to form a groove of an even depth. The first and second grooves may be both formed by using a rotating unit.

Thus, such changes and modifications are deemed to fall within the scope of the present invention, which is defined by the appended claims.

INDUSTRIAL APPLICABILITY

The process and the piping structure of the present invention can be used for inserting a gate valve body into a line of a pipe of water, gas, etc., to disrupt the flow of the fluid with the inserted gate valve body.

The process of the present invention can be employed also when inserting a valve or installing a branch pipe in a flow-undisrupted manner, as well as when installing a new pipe.

REFERENCE SIGNS LIST

1: Straight pipe, 10: Opening, 12: Pipe wall, 13: Outer surface, 14: Inner periphery surface, 15: Ridge 2A: Rotating unit, 2B: Base, 2C: Roller chain, 2D: Linkage, 2R: Roller 2: Piping material, 20: Case, 21: First separate case, Second separate case 23: Engagement portion, 24: Inner periphery surface, 25: Coupling portion, 26: Assembly bolt/nut, 27: Branch pipe portion, 28: Flange, 29: Branch hole 3: Cutting tool, 30: Central axis, 32: Cutter, 33: Feeder 4: Knife gate, 40: Valve main body, 41: Blade, 42: Seal portion, 43: Valve rod, 44: Valve cover, 45: Accommodating portion 5: Positioning jig, 50: Arrangement hole, 51: Positioning portion G: First groove, 1G: Second groove, R: Circumferential direction, S: Axial direction

The invention claimed is:

1. A process for disrupting fluid flow in a pipe with a gate valve inserted in the pipe, the process using:
   a straight pipe made of a polyolefin-based material;
   a pair of ridges made of a polyolefin-based material, extending in a circumferential direction along an outer surface of the straight pipe, the pair of ridges being spaced apart from each other in an axial direction of the straight pipe;
   a piping material including a plurality of metal-made separate cases, the separate cases being separated from each other in the circumferential direction of the straight pipe, the separate cases enclosing a portion of the straight pipe;
   a pair of engagement portions formed on at least one of the separate cases, one of the pair of engagement portions engaging with one of the pair of ridges, another of the pair of engagement portions engaging with another of the pair of ridges;
   a bottomed first groove formed on the outer surface of the straight pipe between the pair of ridges and extending in the circumferential direction of the straight pipe; and
   a knife gate, which is a portion of the piping material, for cutting through a bottom of the bottomed first groove;
   the process comprising:
   a step of arranging a curved rod-shaped piece along the outer surface of the straight pipe, wherein the piece extends in the circumferential direction and is to be the pair of ridges;
   a step of heating the piece to weld the piece to the straight pipe;
   a step of cutting the straight pipe to form the bottomed first groove on the straight pipe;
   a step of attaching the separate cases to the straight pipe so that the piping material accommodating the knife gate therein encloses a portion of the straight pipe including the bottomed first groove and the knife gate opposes the bottomed first groove;
   a step of forming an opening with a blade of the knife gate thrusting through a bottom of the bottomed first groove;
   a step of reaming the opening with a valve main body of the knife gate; and
   a step of inserting the valve main body of the knife gate into the straight pipe so that a seal portion of the valve main body on the proximal end side contacts with a portion of the straight pipe around the opening and a distal end side of the valve main body contacts an inner periphery surface of the straight pipe,
   by the step of inserting, the knife gate, which has the blade having thrusted through the bottom, blocks a pipeline of the straight pipe and disrupts a fluid flow.

2. A process for disrupting fluid flow in a pipe with a gate valve inserted in the pipe, the process using:
   a straight pipe made of a polyolefin-based material;
   a pair of engagement second grooves extending in a circumferential direction along an outer surface of the straight pipe, the pair of engagement second grooves being spaced apart from each other in an axial direction of the straight pipe;
   a piping material including a plurality of metal-made separate cases, the separate cases being separated from each other in the circumferential direction of the straight pipe, the separate cases enclosing a portion of the straight pipe;
   a pair of engagement portions formed on at least one of the separate cases, one of the pair of engagement portions engaging with one of the pair of engagement second grooves, another of the pair of engagement portions engaging with another of the pair of engagement second grooves;
   a bottomed first groove formed on the outer surface of the straight pipe between the pair of engagement grooves, the bottomed first groove extending in the circumferential direction of the straight pipe; and
   a knife gate, which is a portion of the piping material, for cutting through a bottom of the bottomed first groove
   the process comprising:
   a step of attaching a rotating unit, which is rotatable in the circumferential direction of the straight pipe, around the straight pipe, wherein a cutter having a miffing tool is attached to the rotating unit;
   a skin formation step of revolving the cutting tool in the circumferential direction of the straight pipe together with the rotating unit while rotating the milling tool about a central axis of the tool, thereby cutting the outer surface of the straight pipe to form, on the straight pipe, the bottomed first groove, which is elongated in the circumferential direction;
   a step of cutting the straight pipe to form the pair of engagement second grooves on the outer surface of the straight pipe;
   a step of removing the rotating unit and the cutter from the straight pipe;
   a step of attaching the separate cases to the pipe so that the piping material accommodating the knife gate therein encloses a portion of the straight pipe including the bottomed first groove and the knife gate opposes the bottomed first groove;
   a step of forming an opening with a blade of the knife gate thrusting through a bottom of the bottomed first groove;
   a step of reaming the opening with a valve main body of the knife gate; and
   a step of inserting the valve main body of the knife gate into the straight pipe so that a seal portion of the valve main body on the proximal end side contacts with a portion of the straight pipe around the opening and a distal end side of the valve main body contacts an inner periphery surface of the straight pipe,
   by the step of inserting, the knife gate, which has the blade having thrusted through the bottom, blocks a pipeline of the straight pipe and disrupts a fluid flow.

* * * * *